US012561374B1

(12) United States Patent
Tam et al.

(10) Patent No.: US 12,561,374 B1
(45) Date of Patent: Feb. 24, 2026

(54) ENTITY DRIVEN TEMPLATES FOR CUSTOMIZED USER PROMPTS

(71) Applicant: Microsoft Technology Licensing, LLC, Redmond, WA (US)

(72) Inventors: Simon Chun Ho Tam, Calgary (CA); Vincent Liding Wong, Redmond, WA (US); Wirithphol Ek-Ularnpun, San Mateo, CA (US); Chujie He, Bellevue, WA (US); Noelle Beaujon, New York, NY (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/961,441

(22) Filed: Nov. 26, 2024

(51) Int. Cl.
    *G06F 16/00*     (2019.01)
    *G06F 16/903*    (2019.01)
    *G06F 16/9032*   (2019.01)

(52) U.S. Cl.
    CPC .... *G06F 16/9032* (2019.01); *G06F 16/90335* (2019.01)

(58) Field of Classification Search
    CPC ...................... G06F 16/9032; G06F 16/90335
    USPC ........................................................ 707/759
    See application file for complete search history.

(56) References Cited

U.S. PATENT DOCUMENTS 11,127,073 B2 * 9/2021 Walters .............. G06Q 30/0635
2024/0296316 A1 9/2024 Singh

OTHER PUBLICATIONS

"Delegate access to Copilot Dashboard and organizational insights", retrieved from https://learn.microsoft.com/en-us/viva/insights/org-team-insights/delegate-access, Jun. 30, 2025, 9 pages.
"Learn about Copilot prompts", retrieved from https://support.microsoft.com/en-us/topic/learn-about-copilot-prompts-f6c3b467-f07c-4db1-ae54-ffac96184dd5, retrieved on Jul. 8, 2025, 5 pages.
"Organizational data in Viva Insights", retrieved from https://learn.microsoft.com/en-us/viva/insights/advanced/admin/org-data-overview, Jun. 30, 2025, 7 pages.
"The Microsoft 365 Copilot AI Event in Less than 3 Minutes", retrieved from https://www.youtube.com/watch?v=hGb9UZ8DyDc, Mar. 16, 2023, 2 pages.
International Search Report and Written Opinion received for PCT Application No. PCT/US2025/040413,1 PCT01) Mailed on Dec. 15, 2025, 15 Pages.

* cited by examiner

*Primary Examiner* — Chelcie L Daye
(74) *Attorney, Agent, or Firm* — Foley IP Law, PLLC

(57) ABSTRACT

Solutions are disclosed that provide entity driven templates for customized user prompts. Examples surface suggested prompts to a user to guide a chat with a generative artificial intelligence (AI) model, so that the user is able to receive more accurate and more relevant responses than might be expected from a freeform query or a set of generic prompts that do not account for the user's particular organization or role within that organization. A user interface (UI) tooltip enables users to select available data fields associated with entities in a query prompt to receive more relevant, focused results. The entities are culled from data that is specific to the user's own organization, and in some examples prioritized and focused based on the user's particular role in the organization and/or permission to access various elements within the data.

20 Claims, 13 Drawing Sheets

Navigate to a report

Get key insights

View prompts

What is the average collaboration hours for employees in my organization?

Navigate to a report

Get key insights

Team collaboration

What is the average collaboration hours for employees in my organization?

How is work-life balance in my organization?

Ask a question

START

300

| GENERATE PROMPT TEMPLATES | 302 |

| STORE PROMPT TEMPLATES | 304 |

| GENERATE ENTITY VALUES | 306 |

| PRIORITIZE ENTITY VALUES | 308 |

| STORE ENTITY VALUES | 310 |

| ONE USER SHARES PERMISSION WITH ANOTHER | 312 |

| USER LOGS IN / OPENS APPLICATION | 314 |

| DETERMINE USER GROUP | 316 |

| DETERMINE USER ROLE IN USER GROUP | 318 |

| DETERMINE USER PERMISSIONS FOR USER GROUP DATA | 320 |

USER GROUP    108

109 →    104

106    102

COMPUTING ENVIRONMENT    120

USER GROUP DATA    122

PROMPT LIBRARY    124

QUERY PROMPT TEMPLATE    202

QUERY PROMPT TEMPLATE    702

QUERY PROMPT TEMPLATE    706

ENTITY LIBRARY    126

ENTITY VALUES    130

SELECTION    132

PRIORITY IND.    134

OTHER CONTENT    128

GEN. AI MODEL    160

QUERY    762

RESULTS    704

PROFILE LIBRARY    150

USER PROFILE    152

USER GROUP ID    154

USER ROLE    156

PERMISSIONS    158

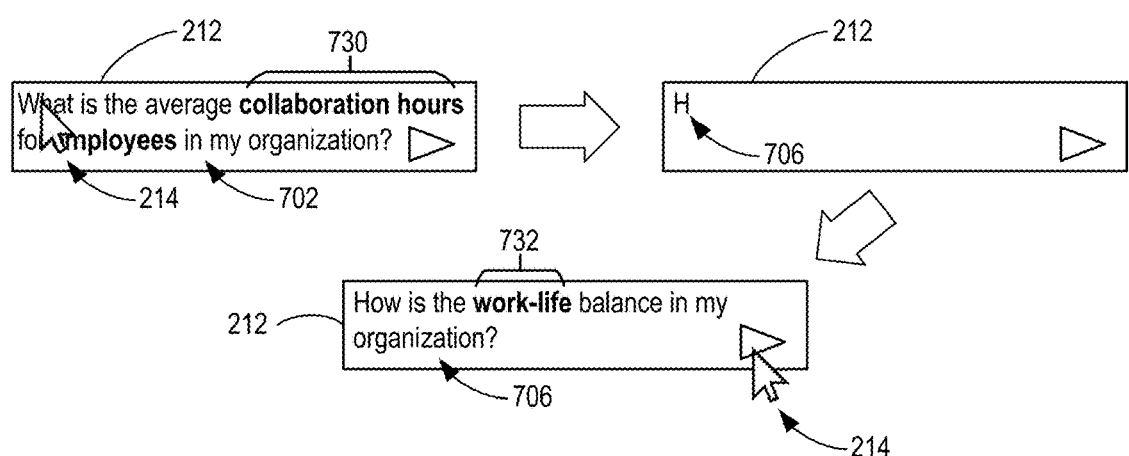

212

730

What is the average collaboration hours for employees in my organization?

214    702

212

H

706

212

732

How is the work-life balance in my organization?

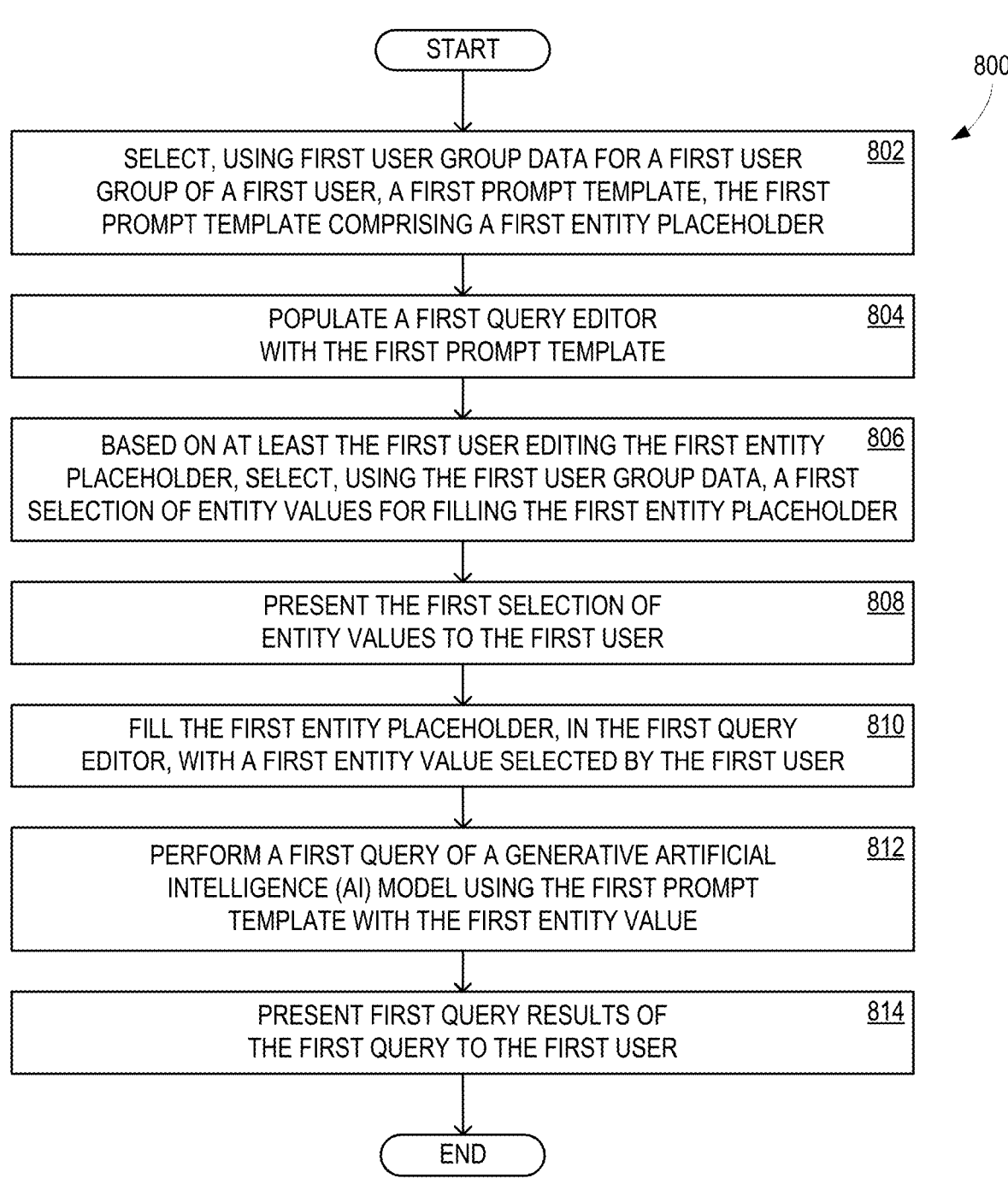

START

800

SELECT, USING FIRST USER GROUP DATA FOR A FIRST USER GROUP OF A FIRST USER, A FIRST PROMPT TEMPLATE, THE FIRST PROMPT TEMPLATE COMPRISING A FIRST ENTITY PLACEHOLDER  802

POPULATE A FIRST QUERY EDITOR WITH THE FIRST PROMPT TEMPLATE  804

BASED ON AT LEAST THE FIRST USER EDITING THE FIRST ENTITY PLACEHOLDER, SELECT, USING THE FIRST USER GROUP DATA, A FIRST SELECTION OF ENTITY VALUES FOR FILLING THE FIRST ENTITY PLACEHOLDER  806

PRESENT THE FIRST SELECTION OF ENTITY VALUES TO THE FIRST USER  808

FILL THE FIRST ENTITY PLACEHOLDER, IN THE FIRST QUERY EDITOR, WITH A FIRST ENTITY VALUE SELECTED BY THE FIRST USER  810

PERFORM A FIRST QUERY OF A GENERATIVE ARTIFICIAL INTELLIGENCE (AI) MODEL USING THE FIRST PROMPT TEMPLATE WITH THE FIRST ENTITY VALUE  812

PRESENT FIRST QUERY RESULTS OF THE FIRST QUERY TO THE FIRST USER  814

END

Figure 9:
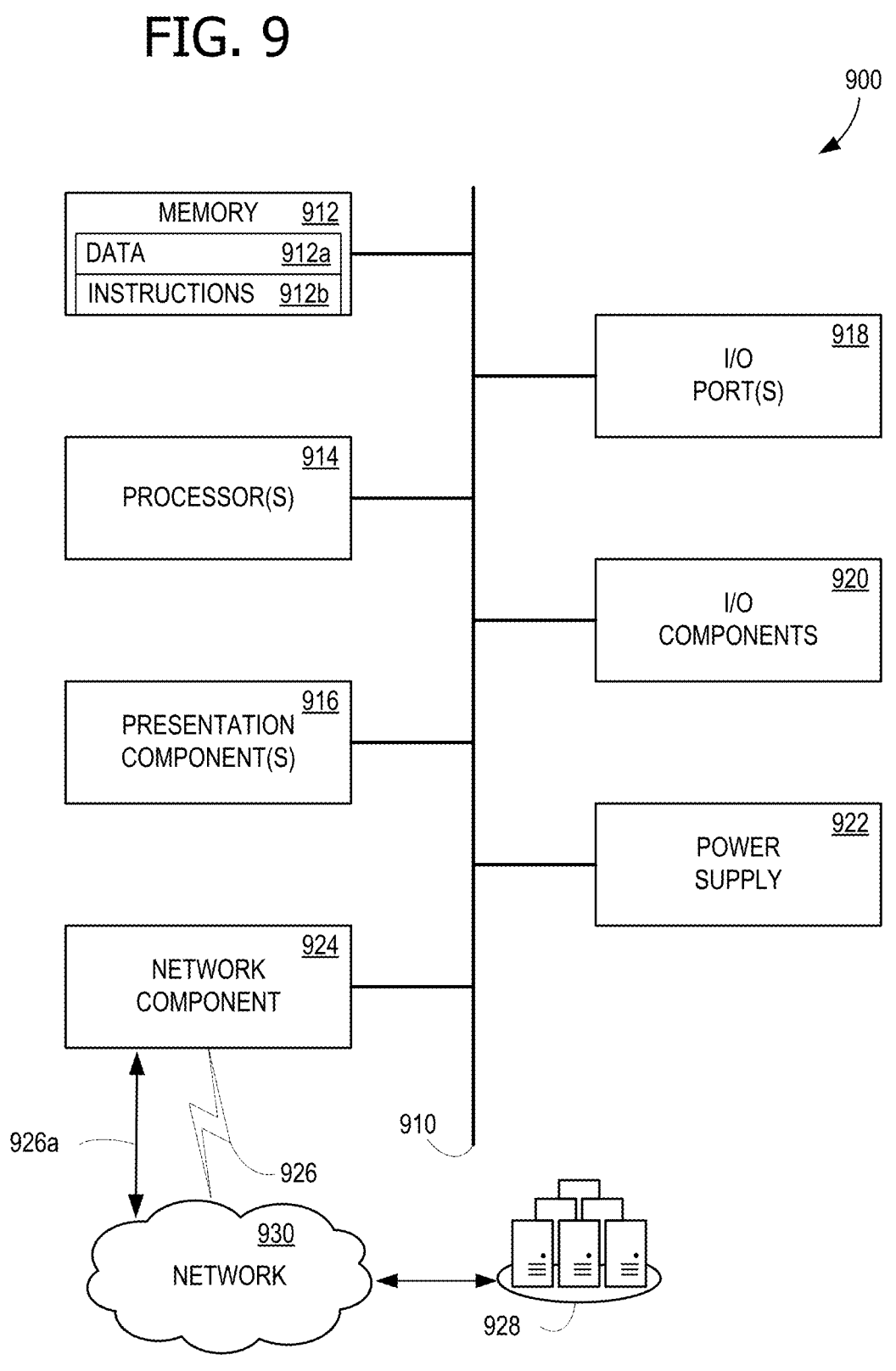

MEMORY     912
DATA     912a
INSTRUCTIONS     912b

918
I/O
PORT(S)

914
PROCESSOR(S)

920
I/O
COMPONENTS

916
PRESENTATION
COMPONENT(S)

922
POWER
SUPPLY

924
NETWORK
COMPONENT

926a

926

910

930
NETWORK

928

ENTITY DRIVEN TEMPLATES FOR CUSTOMIZED USER PROMPTS

BACKGROUND

Conventional artificial intelligence (AI) tools, such as AI assistants employing generative AI models, provide suggested prompts to users for performing queries. However, these query prompt suggestions are not optimized for enterprise use and are typically based on previously entered query prompts. Unfortunately, in scenarios in which data sets vary among different organizations (e.g., businesses or enterprises, referred to herein generically as user groups) a query that is relevant for some users may provide meaningless results for another. Additionally, if different users—even within the same user group—have differing permissions relative to the queried data, a query that returns relevant information for one user may not provide meaningful results for another user without the same level of data access permission.

SUMMARY

The disclosed examples are described in detail below with reference to the accompanying drawing figures listed below. The following summary is provided to illustrate some examples disclosed herein.

Solutions disclosed herein provide for entity driven templates for customized user prompts. Examples select, using first user group data for a first user group of a first user, a first prompt template, the first prompt template comprising a first entity placeholder; populate a first query editor with the first prompt template; based on at least the first user editing the first entity placeholder, select, using the first user group data, a first selection of entity values for filling the first entity placeholder; present the first selection of entity values to the first user; fill the first entity placeholder, in the first query editor, with a first entity value selected by the first user; perform a first query of a generative artificial intelligence (AI) model using the first prompt template with the first entity value; and present first query results of the first query to the first user.

BRIEF DESCRIPTION OF THE DRAWINGS

The disclosed examples are described in detail below with reference to the accompanying drawing figures listed below:

FIG. 7 illustrates an alternative operation of examples of the architecture of FIG. 1;

FIG. 8 shows another flowchart illustrating exemplary operations that may be performed when using example architectures, such as the architecture of FIG. 1; and FIG. 9 shows a block diagram of an example computing device suitable for implementing some of the various examples disclosed herein.

Corresponding reference characters indicate corresponding parts throughout the drawings.

DETAILED DESCRIPTION

Solutions are disclosed that provide entity driven templates for customized user prompts. Examples surface suggested prompts to a user to guide a chat with a generative artificial intelligence (AI) model, so that the user is able to receive more accurate and more relevant responses than might be expected from a freeform query or a set of generic prompts that do not account for the user's particular organization or role within that organization. A user interface (UI) tooltip enables users to select available data fields associated with entities in a query prompt to receive more relevant, focused results. The entities are culled from data that is specific to the user's own organization, and in some examples prioritized and focused based on the user's particular role in the organization and/or permission to access various elements within the data.

Aspects of the disclosure solve multiple problems that are necessarily rooted in computer technology, and render computing platforms more effective and responsive to user needs, by providing the practical result of tailoring query prompts to users. This improves the accuracy and relevance of query results returned by generative AI models. These advantageous results are accomplished, at least in part, by based on at least a first user editing a first entity placeholder, selecting, using first user group data, a first selection of entity values for filling the first entity placeholder, and performing a first query of a generative AI model using the first prompt template with the first entity value.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
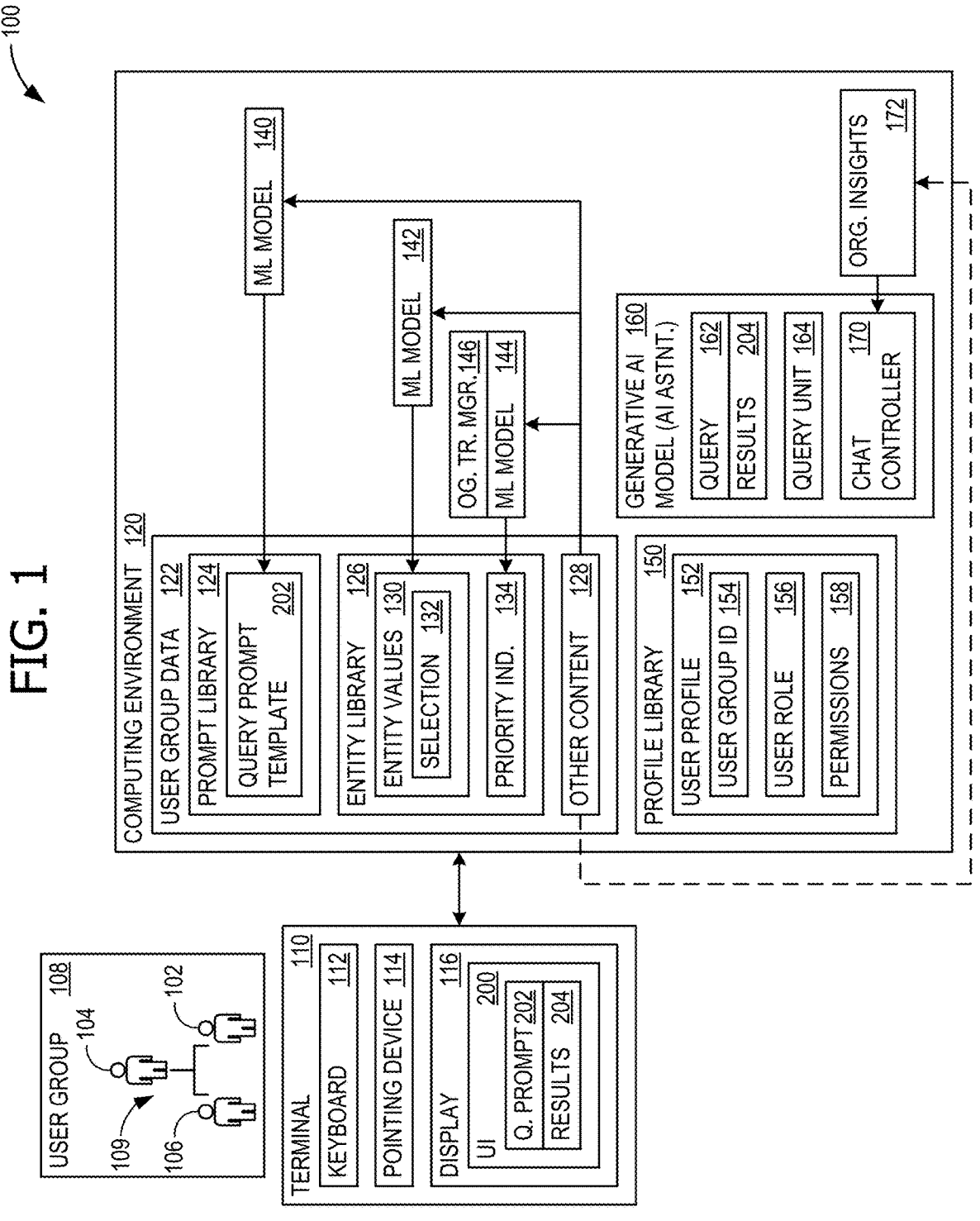
FIG. 1 illustrates an example architecture that advantageously provides entity driven templates for customized user prompts.

FIG. 1 illustrates an example architecture that advantageously provides entity driven templates for customized user prompts. A user 102 is part of a user group 108, such as an organization or a business enterprise. Another user 104, also within user group 108, is higher within an organization hierarchy 109 than user 102 or a user 106. User 102 employs a terminal 110 to perform a query 162 of a generative AI model 160 within a computing environment 120. In some examples, generative AI model 160 is part of an AI assistant, such as Copilot, Duet, or another AI assistant. In some examples, computing environment 120 is remote from terminal 110, such as across a computer network (e.g., a private network or the internet), and/or is virtualized or distributed among multiple hardware computing devices (such as is shown in FIG. 9).

User 102 uses a prompt template 202 that is suggested by generative AI model 160, and receives query results 204, although, in some examples, the AI model that suggests query prompts (such as prompt template 202) is a different AI model than the one that actually performs the query on the data in order to return the query results. Generative AI model 160 acts as a tooltip when suggesting prompt template 202 and refinements to prompt template 202 (i.e., replacement entity values, as described below). Terminal

110 has a keyboard 112 (physical or virtual) and a pointing device 114 (e.g., mouse, trackpad, touchscreen) for editing prompt template 202, and a display 116 for displaying a UI 200 that shows prompt template 202 and query results 204. That is, user 102 uses UI 200 to submit query 162 as prompt template 202 and receive query results 204.

In addition to generative AI model 160, computing environment 120 hosts relevant data for query 162 and other queries, including user group data 122 and a user profile library 150. Although computing environment 120 and generative AI model 160 are each illustrated as singular entities, it should be understood that the functionality described herein for computing environment 120 and generative AI model 160 may be distributed both logically and physically among multiple computing platforms. User group data 122 has a prompt library 124 and an entity library 126. Prompt library 124 has at least a prompt template 202, which is shown in further detail in relation to FIGS. 2A-2G, and other prompt templates, shown in FIGS. 5 and 6.

Entity library 126 has entity values 130, priority indication 134 indicating the priority of various ones of entity values 130 for suggesting to users, and at least a selection of entity values 132 that is selected from among entity values 130 for presentation specifically to user 102 when user 102 is editing prompt template 202. An entity is an abstraction for a data attribute, such as a specific term or phrase, which may be included within a query performed on a data set, such as other data content 128. Other data content 128 includes information about user group 108, such as numbers and locations of people in various subgroups of user group 108 (e.g., employees in different divisions and offices) and metrics relevant to people or other aspects of user group 108.

An entity is an abstraction may represent a role, with possible entity values being managers, subordinates, contractors, employees. Another entity may represent a performance metric, with possible entity values being selected based on privacy considerations. Examples of entities for enterprise organizations may include a personnel or employee number, a hire date, job title, functional role, work site name, onsite versus remote, identity of manager, and others. Entity values 130 may be stored securely, and subject to dissemination limitations, due to the potential presence of personally identifiable information (PII). The entity values are included in a query, and the data to answer the query within other data content 128. Thus, the permission of user 102, to see or not see certain data, as well as what data is contained or is not contained within other data content 128, affects which entity values are relevant to user 102 and should (or should not) be suggested to user 102 when user 102 is editing prompt template 202.

A machine learning (ML) model 140 generates prompt templates, such as prompt template 202, to populate prompt library 124. In some examples, prompt library 124 is not used, and ML model 140 generates prompt templates dynamically, as needed. An ML model 142 generates entity values, such as entity values 130, to populate entity library 126. In some examples, entity library 126 is not used, and ML model 142 generates entities dynamically, as needed. An ML model 144 generates selections of entity values, such as selection of entity values 132, to populate entity library 126.

In some examples, ML model 144 generates selections of entity values dynamically, as needed, based upon which user is editing which prompt template. For example, user 102 is presented a set of prompt templates 202 in UI 200 after a fetch for suggestions is serviced by the chat controller, in which the templates are augmented with entities from organization insight dataset 172. The data may be fetched using a request for a noun/verb/adjective/adverb, or other suitable identifier, based on content extracted from what user 102 is typing. Organizational insights dataset 172 may be any convenient data file, such as a comma separated values (CSV) file, and stores data related to user group 108 that is curated by pulling select data from other content 128 on some schedule that maintains the accuracy and relevancy of organizational insights dataset 172 to user group 108 over time. The returned nouns/verbs/adjectives/adverbs are then used as potential entity values 130 by ML model 142. ML model 144 may then generate priority indication 134 for entity values 130, and selection of entity values 132 is some maximum count of entities, having the highest priority for a particular user, selected for suggestion to that user (e.g., the highest 5 or so most relevant entities), based on the display area available within UI 200. In some examples, an ongoing training manager 146 monitors selections of entity values and provides ongoing training to ML model 144 to improve performance over time.

Figure 4:
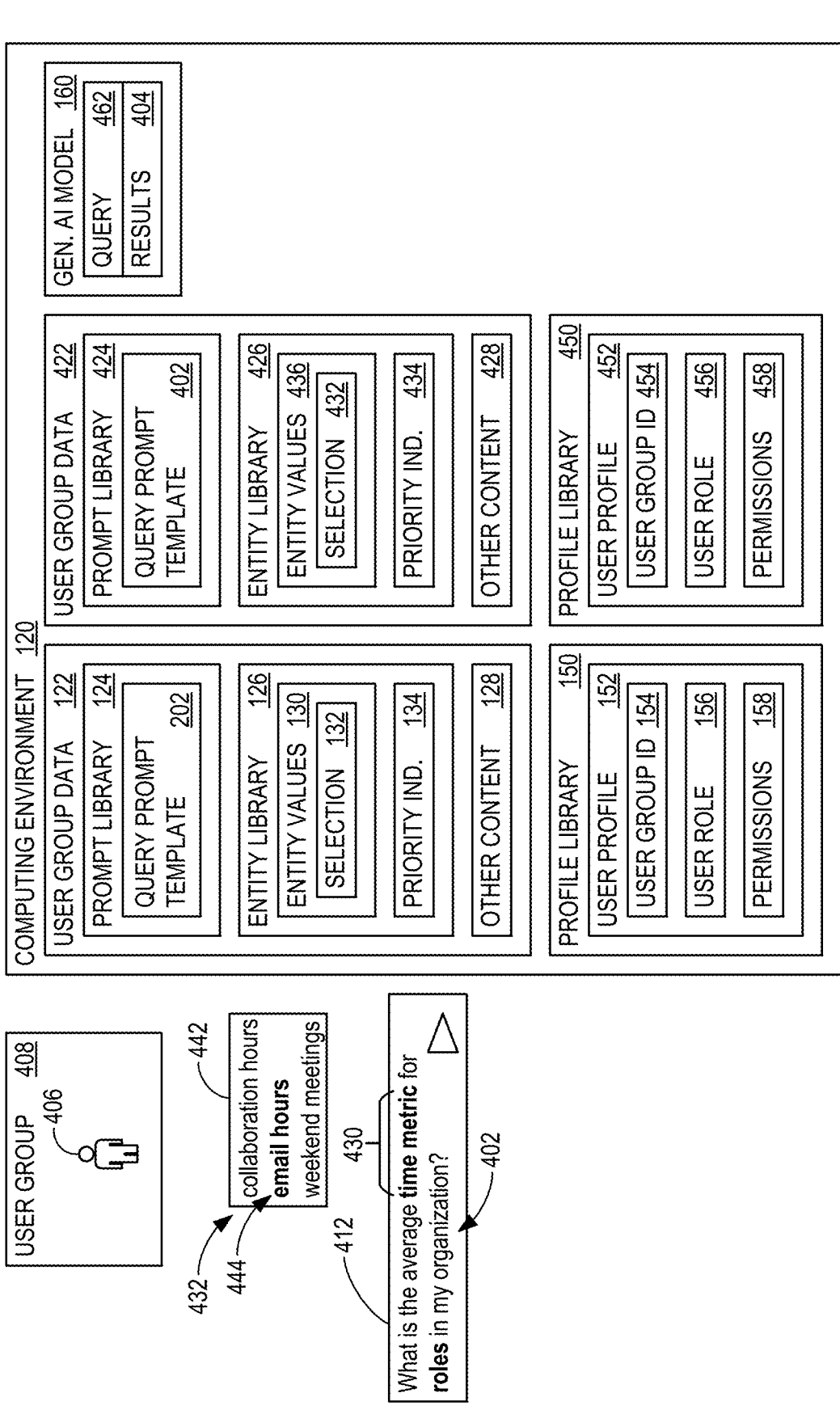
FIG. 4 illustrates use of the architecture of FIG. 1 by a different user in a different user group (or organization)
Figure 5:
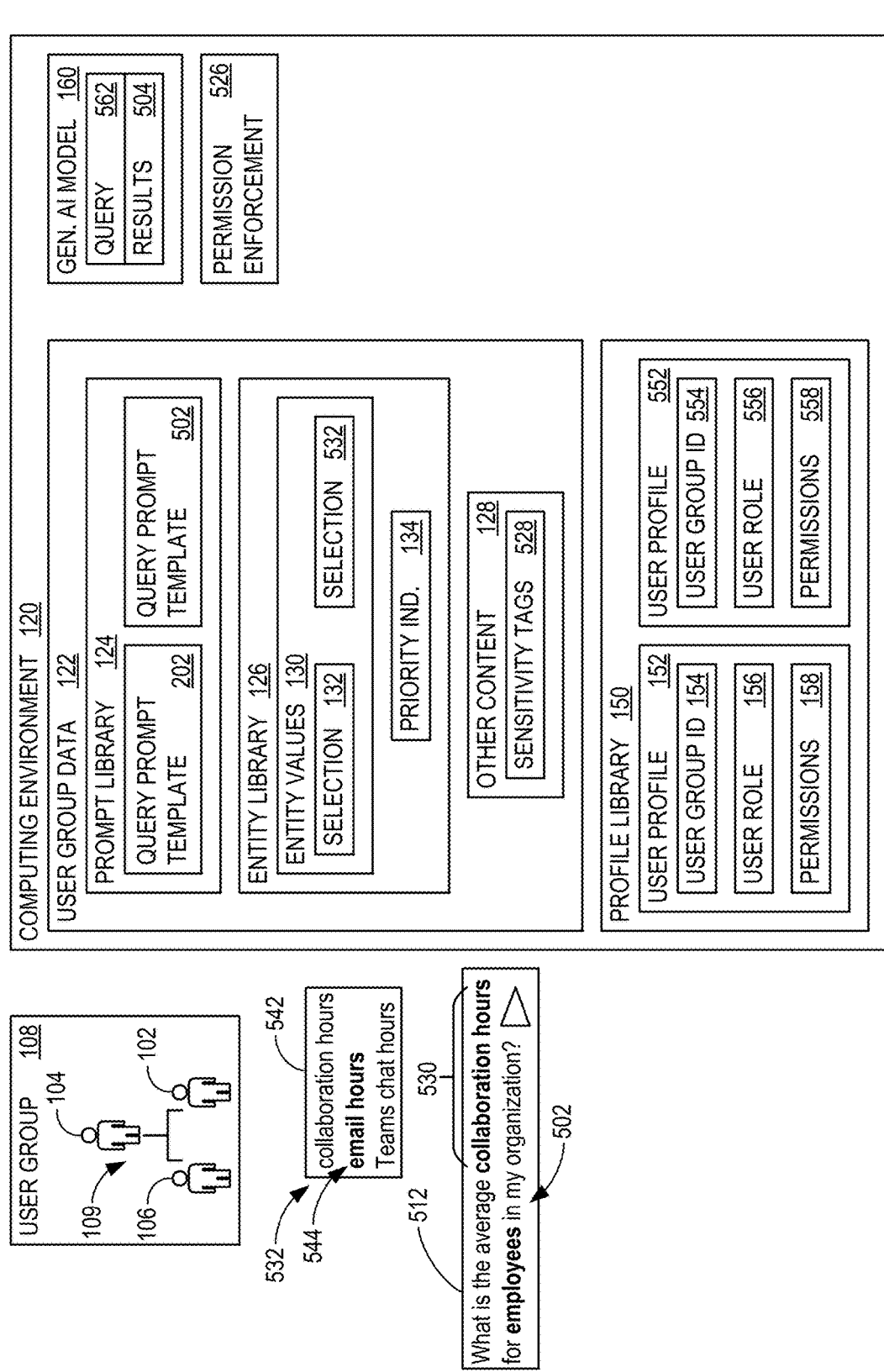
FIG. 5 illustrates use of the architecture of FIG. 1 by a different user in a common user group.
Figure 6:
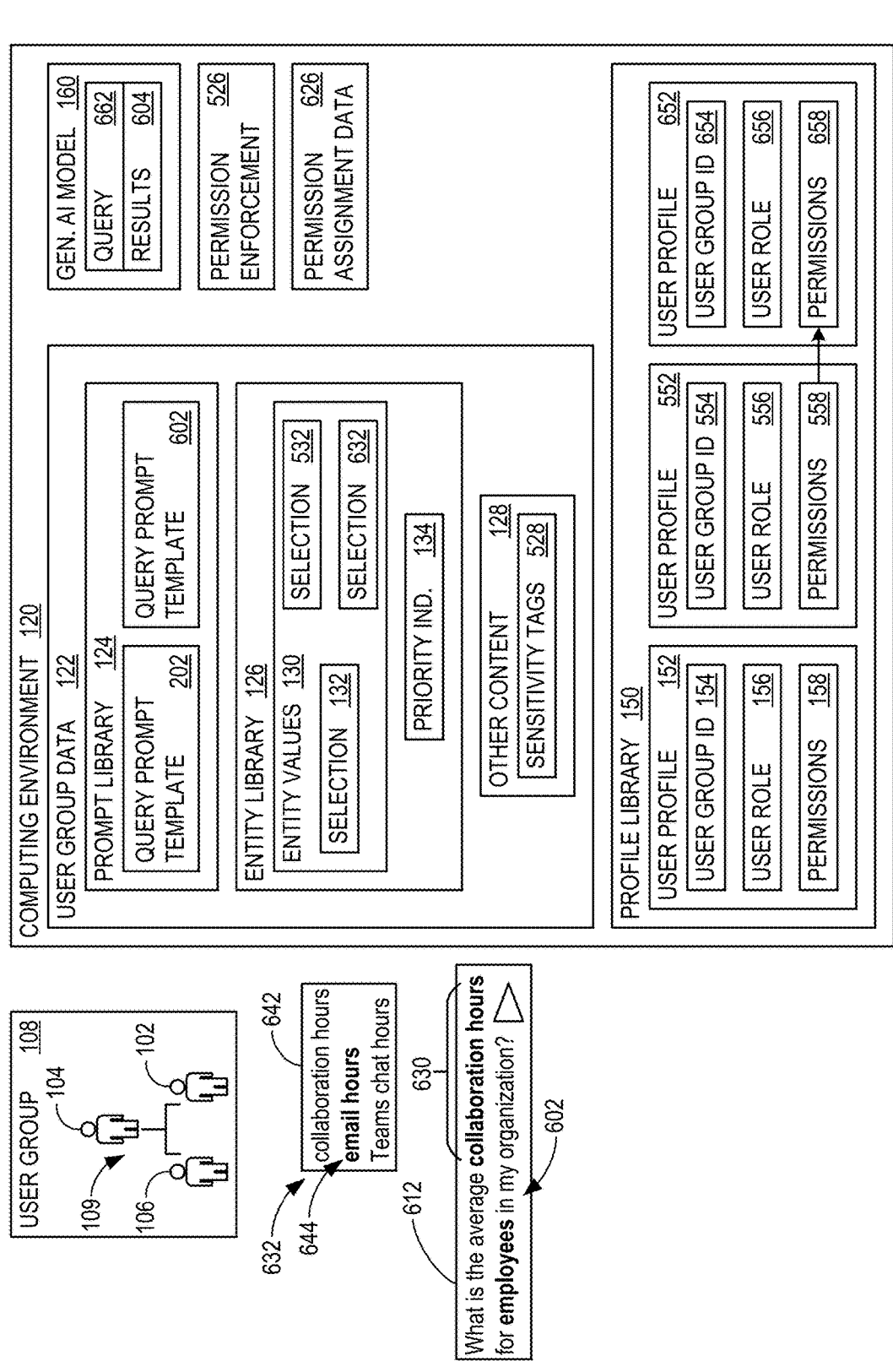
FIG. 6 illustrates use of the architecture of FIG. 1 with shared permissions among different users.

User profile library 150 holds at least user profile 152 for user 102, as well as user profiles for users, as shown in FIGS. 4, 5, and 6. User profile 152 has a user group ID 154, indicating that user 102 is a member of user group 108, as well as role 156 of user 102 within user group 108, and permissions 158 associated with role 156 relative to information within other data content 128. For example, user 102 may be precluded from seeing information regarding user 104 and user 106, whereas user 104 has permission to see information regarding both user 102 and user 106 because of the different roles within user group 108, as shown in organization hierarchy 109.

Upon completion of user 102 editing prompt template 202 as a chat entry, the edited prompt is sent as query 162 to generative AI model 160. In some examples, an initial assessment of query 162 is performed to identify whether it is sufficiently close to a previously-identified common query. This may use a cosine similarity test of query 162 with previously-identified queries, (e.g., already-existing prompt templates within prompt library 124). If the confidence is high (e.g., a high cosine similarity score), generative AI model 160 may omit certain stages, such as intent detection, to reduce latency. Otherwise, generative AI model 160 may process query 162 as a standard large language model (LLM) input prompt.

Generative AI model 160 uses a query unit 164 to generate query results 204 from other data content 128 of user group data 122, and returns query results 204 to terminal 110 for display in UI 200. In some examples, query unit 164 is a separate AI or ML model. Generative AI model 160 may include LLMs and/or multi-modal models (MMs). AI and ML are generally used interchangeably herein. Generative AI model 160 also has chat controller 170 to convert prompt template 202 into query 162, and to present query results 204 in a natural language (NL) expression.

Figure 2B:
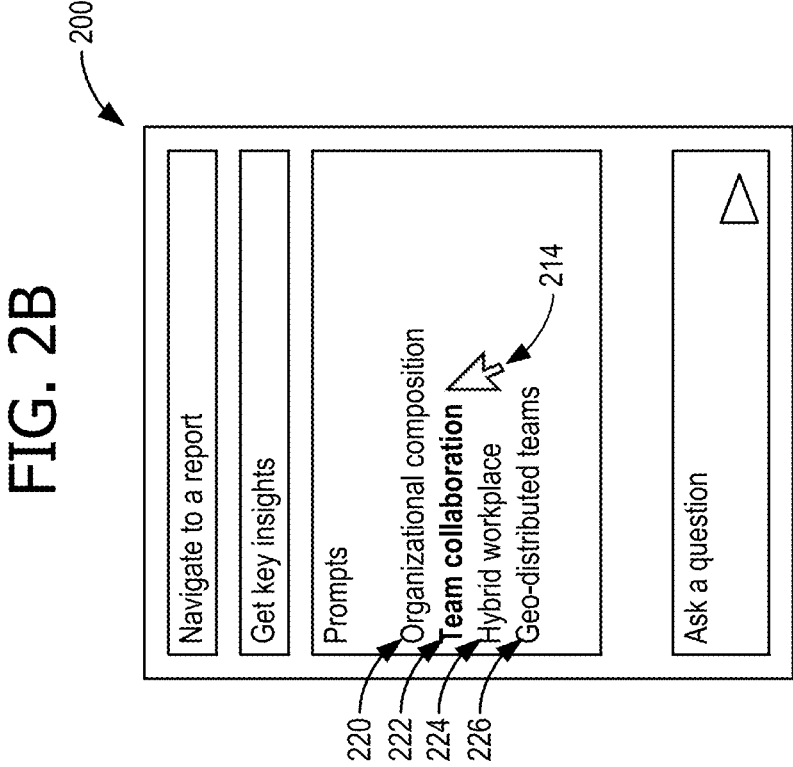
FIGS. 2A-2H illustrates an exemplary user interface (UI) at various stages during the operation of the architecture of FIG. 1.
Figure 2A:
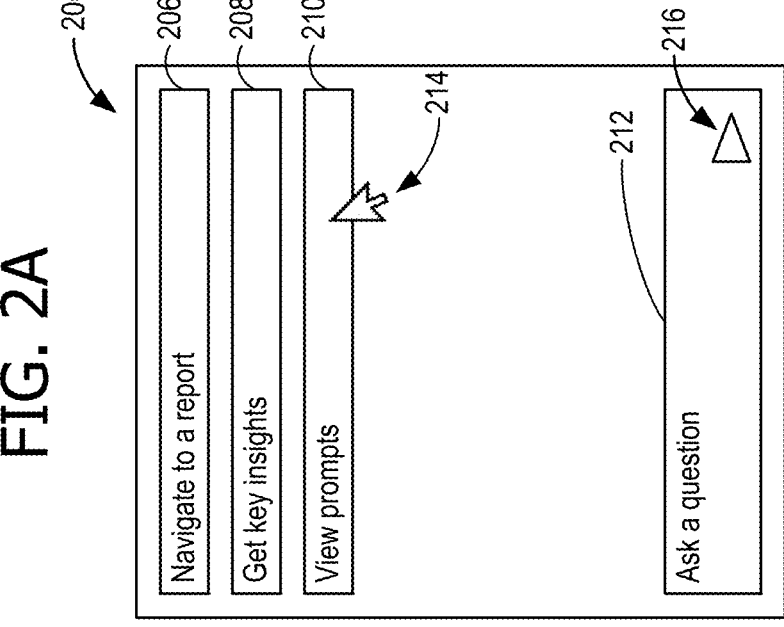

FIGS. 2A-2H illustrates UI 200 at various stages during the operation of architecture 100. FIG. 2A shows UI 200 in an initial presentation configuration, with a UI control 206 enabling user 102 to navigate to a report about user group 108, a UI control 208 enabling user 102 to obtain key insights about user group 108, a UI window 210 that triggers the display of prompt templates, and a query editor 212 into which user 102 can type or edit chat lines (such as prompt templates or other queries). Query editor 212 has a send button 216 that transmits the most recently entered (i.e., the current line) of query editor 212 to chat controller 170. As illustrated, user 102 has placed a pointer indicator 214, shown as a cursor arrow, over UI window 210 in order to display prompt template categories.

FIG. 2B shows UI 200 upon the display of available prompt template categories. A prompt template category 220 reads "Organizational composition," a prompt template category 222 reads "Team collaboration," a prompt template category 224 reads "Hybrid workplace," and a prompt template category 226 reads "Geo-distributed teams." These prompt categories are collections of available prompt templates, which are available based on the content of other data content 128. For example, an organization that has only members at a single location would not have a prompt template category of "Geo-distributed teams." As illustrated, user 102 has placed pointer indicator 214 over prompt template category 222 to select it.

Figure 2D:
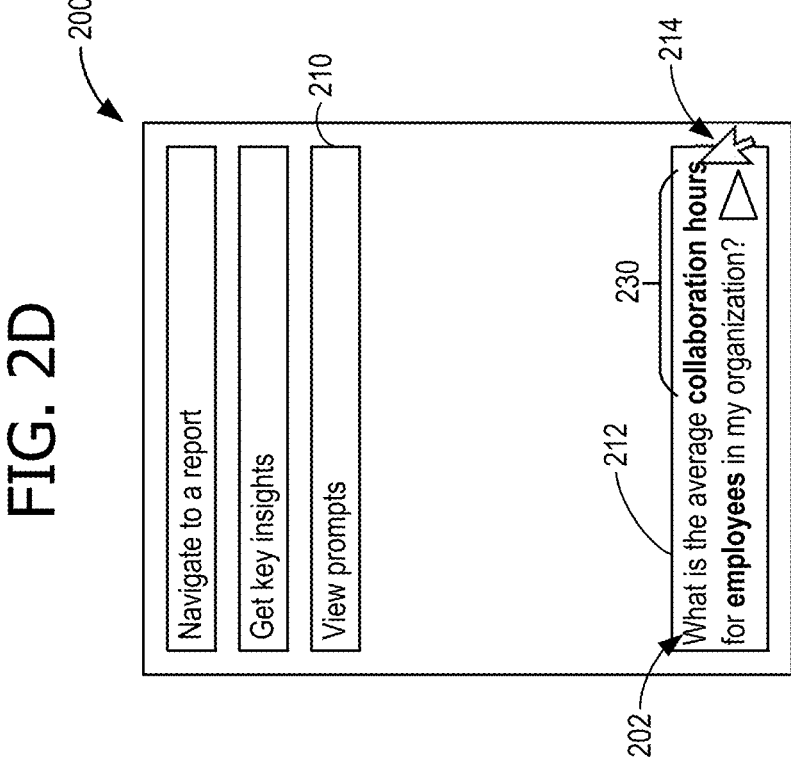
Figure 2C:
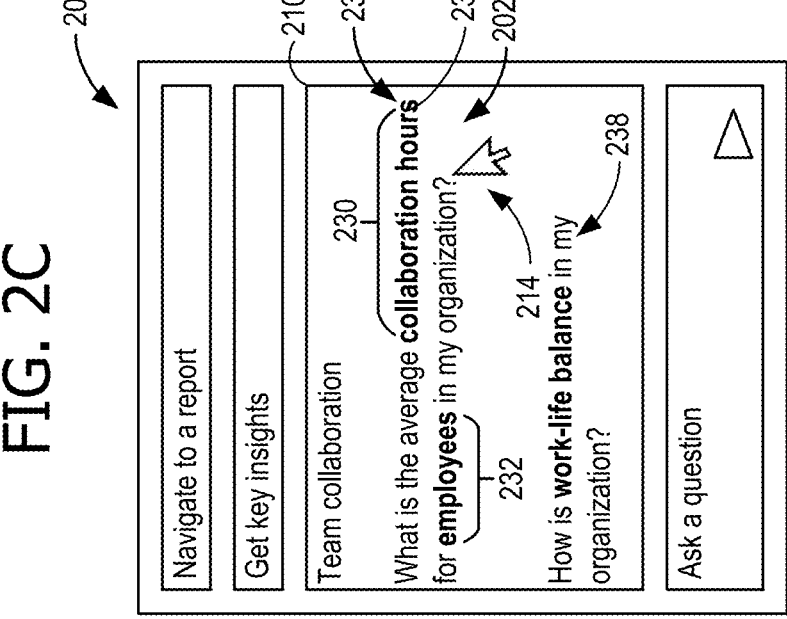

FIG. 2C shows UI 200 upon the display of "Team collaboration" prompt templates. Two prompt templates are shown in UI window 210, although some examples may display a different count. Prompt template 202 reads "What is the average collaboration hours for employees in my organization?" and prompt template 238 reads "How is work-life balance in my organization?" The phrases "collaboration hours" and "employees" represent entities. An entity placeholder 230 uses "collaboration hours" as its default entity value 234, and an entity placeholder 232 uses "employees" as its default entity value 234. In some examples, an entity placeholder is indicated within the text of a prompt template with highlighting such as a background color or different font. For example, highlighting 236 for entity placeholder 230 and entity placeholder 232 is shown as use of a bold font. As illustrated, user 102 has placed pointer indicator 214 over prompt template 202 to select it.

FIG. 2D shows UI 200 upon the display of prompt template 202 within query editor 212. UI window 210 returns to its prior content, and user 102 has placed pointer indicator 214 over prompt template 202 to select it for editing.

Figure 2F:
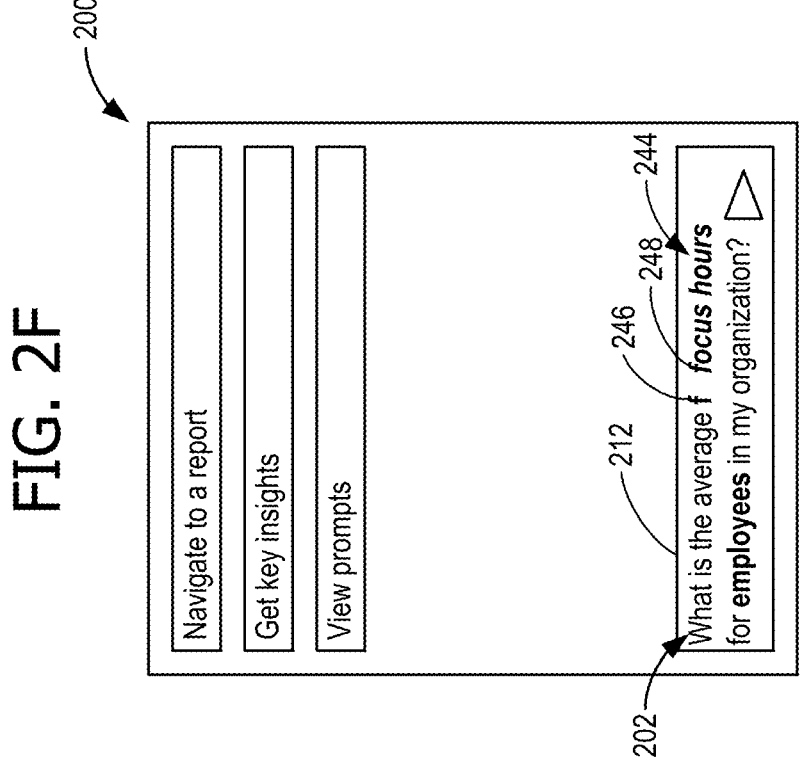
Figure 2E:
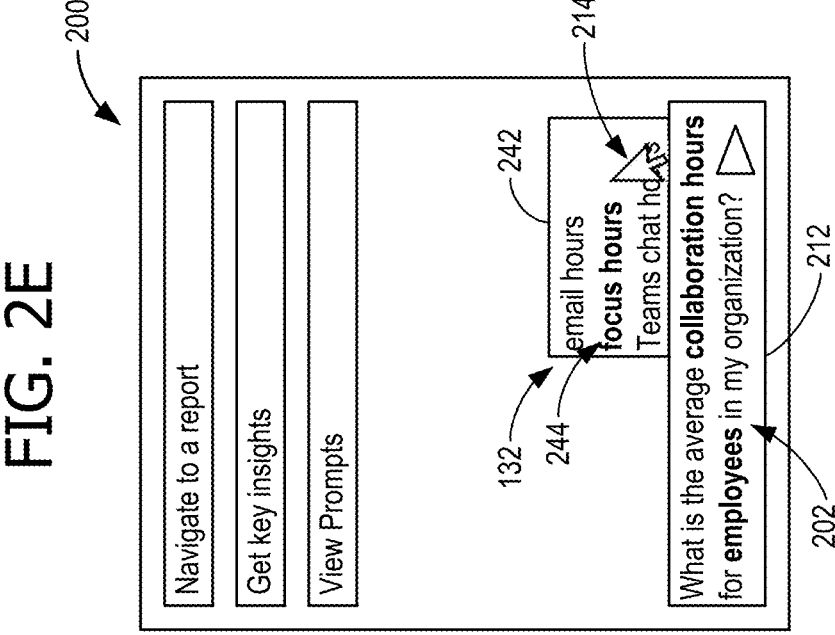

FIG. 2E shows UI 200 upon user 102 editing prompt template 202 using pointing device 114, as indicated by movement of pointer indicator 214 and a selection action (e.g., a click or tap). A menu 242 of selection of entity values 132 is displayed nearby prompt template 202, indicating to user 102 that any entity value within selection of entity values 132 is available for replacing default entity value 234 ("collaboration hours") in prompt template 202. As illustrated, user 102 has placed pointer indicator 214 over an entity value 244 that reads "focus hours" to select it.

FIG. 2F shows UI 200 upon user 102 editing prompt template 202 by instead using keyboard 112. Some examples permit editing of prompt templates using either the pop-up menu shown in FIG. 2C, or by typing over the prior content of a prompt template using keyboard 112. As illustrated, user 102 has already entered a first the typed character 246, shown as "f". The selection of entity value 244, which also has an "f" (character 248) may be accomplished using fuzzy searching of selection of entity values 132 (if menu 242 is not displayed) or fuzzy searching of menu 242 (if menu 242 is displayed while user 102 is typing). Some examples update suggestions of entity values upon each keystroke of keyboard 112 that enters a new character inside an entity placeholder. If multiple entity values begin with the same letter, the suggested entities are refined with the user typing additional characters.

Figure 2H:
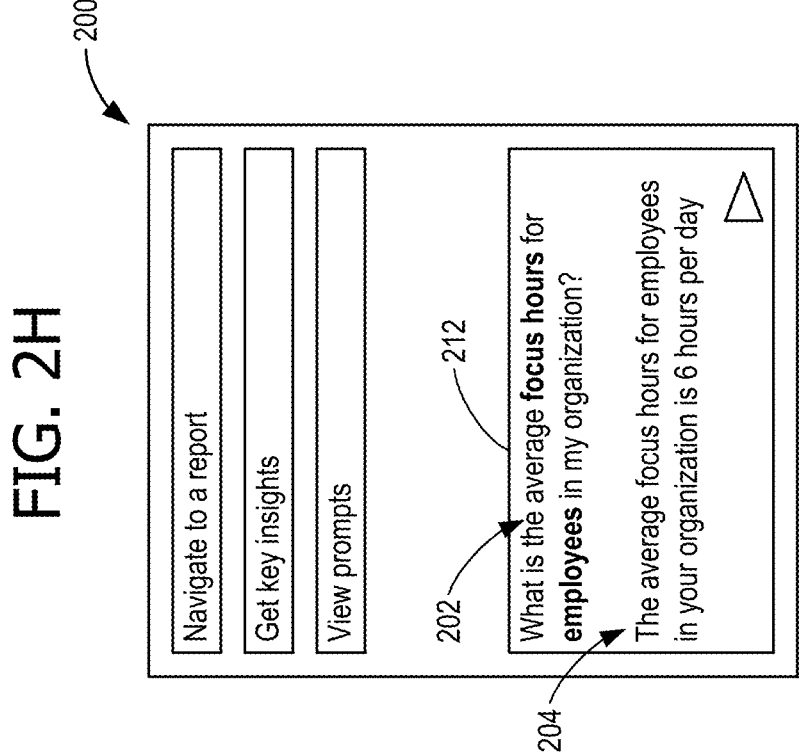
Figure 2G:
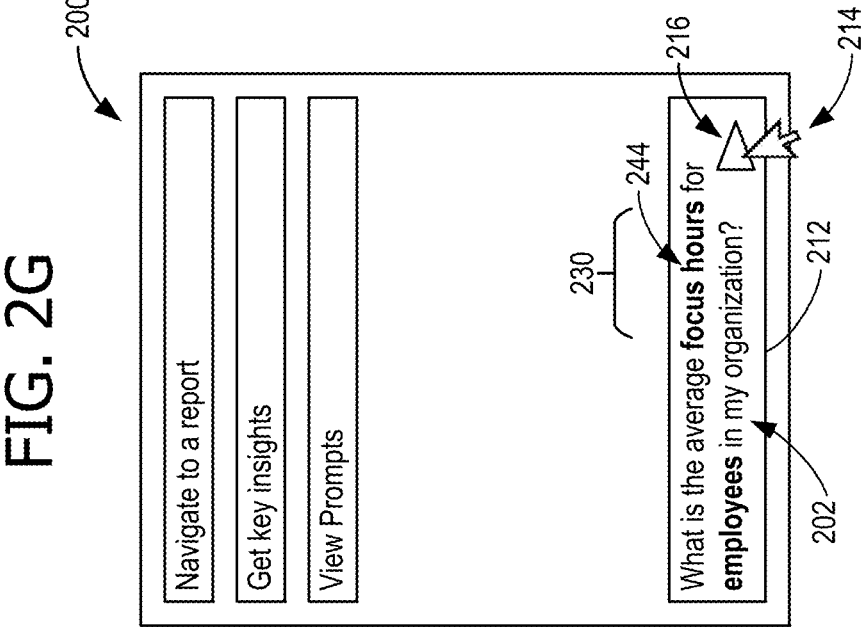

With either way of editing inside of prompt template 202, as shown in FIG. 2C and FIG. 2D, the final version of prompt template 202, that user 102 submits to become query 162, is shown in FIG. 2G. The final version of prompt template 202, which is used for query 162, contains entity value 244 within entity placeholder 230. As illustrated, user 102 has placed pointer indicator 214 over send button 216 send button 216 to initiate query 162.

FIG. 2H shows UI 200 upon receipt of query results 204 and display of query results 204 in query editor 212. Some examples may display query results 204 elsewhere in UI 200, outside of query editor 212. That is, query results 204 may be displayed as shown in FIG. 2H, or in another location within UI 200. Editing of prompt template 202 outside of an entity placeholder, to replace the entirety of the prompt template (rather than just an entity value), is show below, in FIG. 7.

Figure 3A:
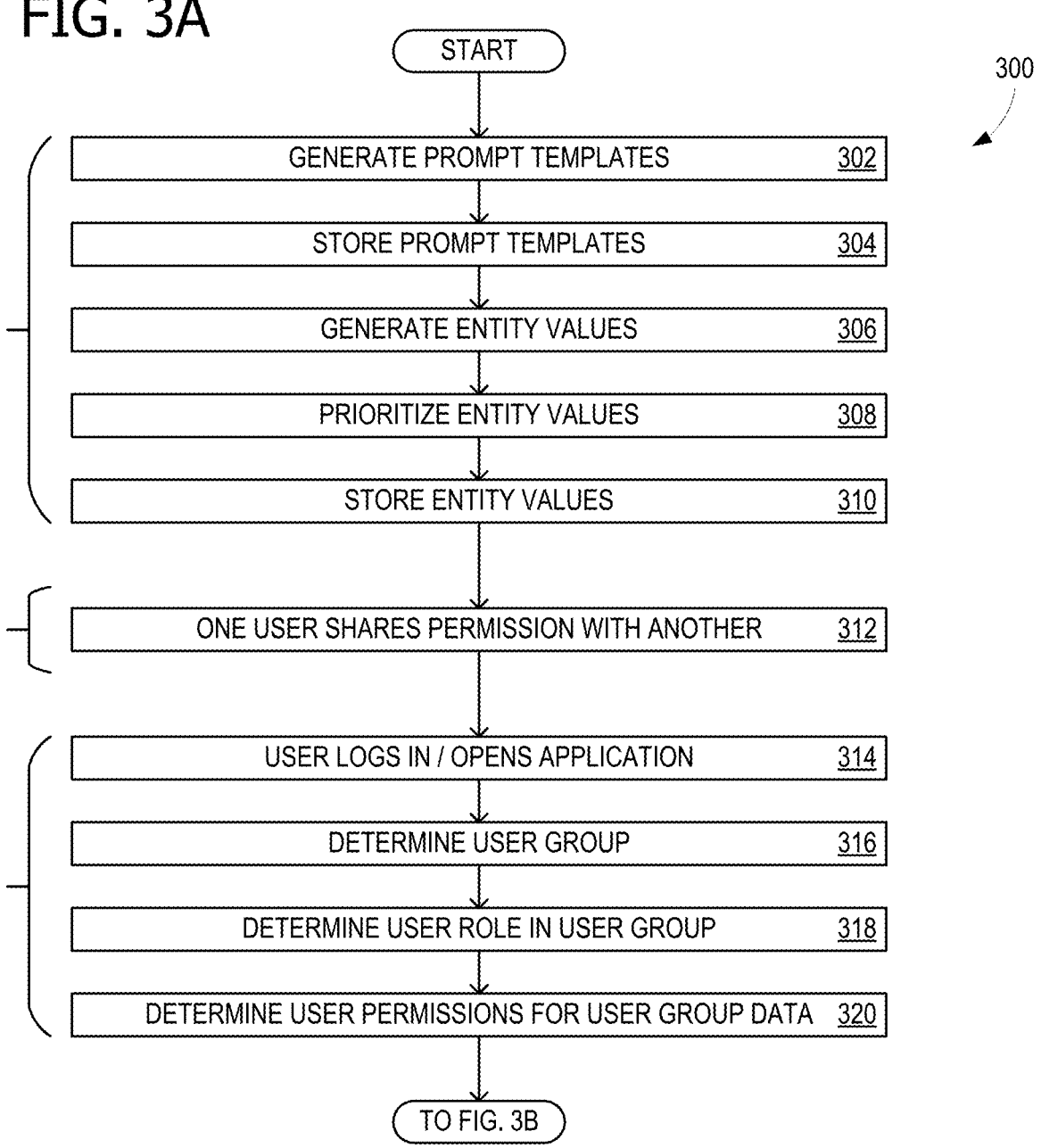
FIGS. 3A and 3B together show a flowchart illustrating exemplary operations that may be performed when using example architectures, such as the architecture of FIG. 1.
Figure 3B:
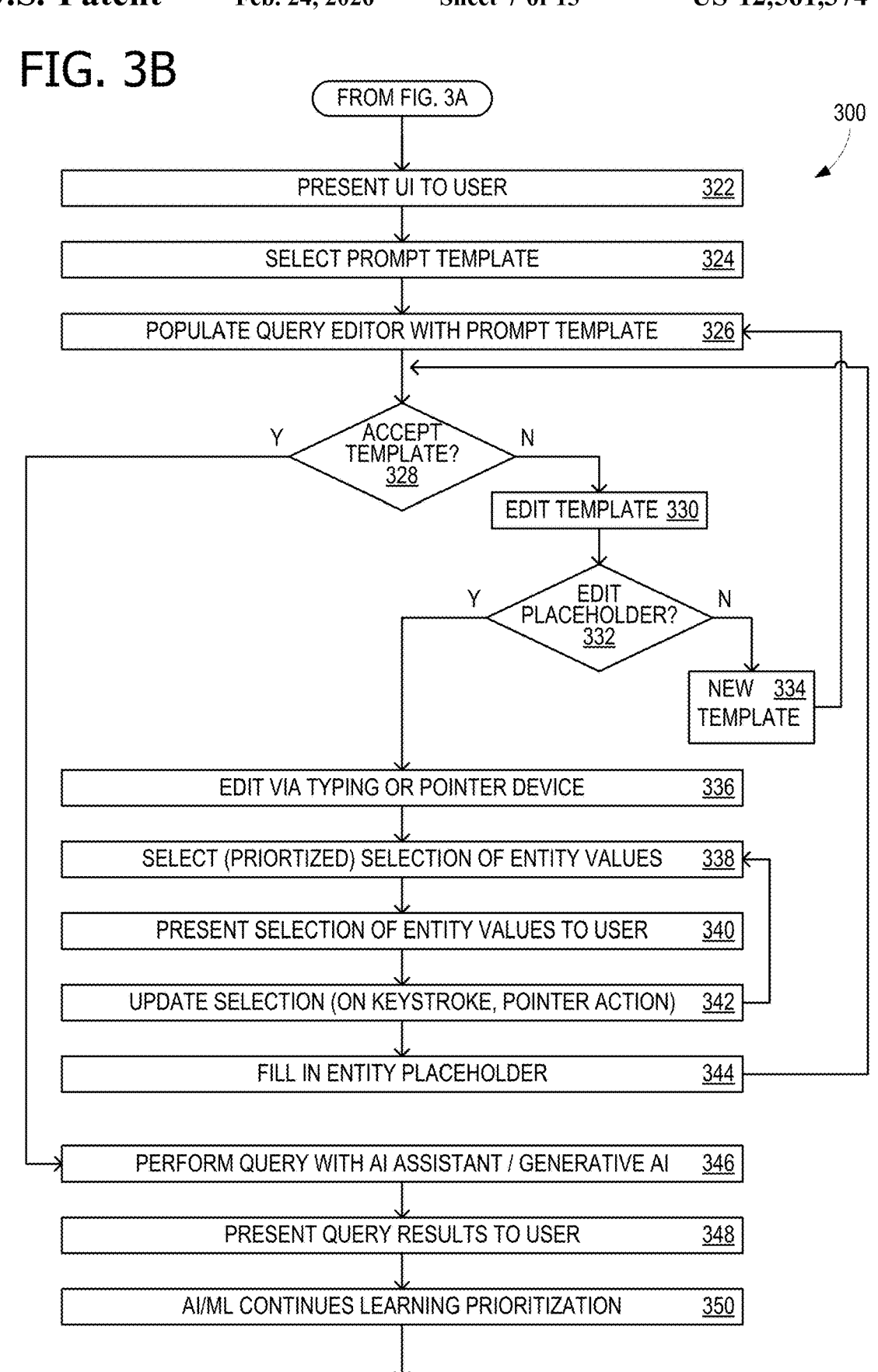

FIGS. 3A and 3B together show a flowchart 300 illustrating exemplary operations that may be performed by architecture 100. In some examples, operations described for flowchart 300 are performed by computing device 900 of FIG. 9. Flowchart 300 spans FIGS. 3A and 3B and is described first in relation to FIGS. 1 and 2 for user 102 performing a subset of the illustrated operations. Additional operations and branches of flowchart 300 are described in relation to FIGS. 4-7, as identified below.

Flowchart 300 commences with generating prompt templates (e.g., prompt template 202) using the user group data for those user groups (e.g., user group data 122 for user group 108) in operation 302, as shown in FIG. 3A. Each user group may correspond to a different organization. Each user group data (e.g., enterprise data) may include attributes (e.g., job title, department, work location at various resolutions such as facility up to country) associated with different data elements from which the selections of entities are generated. In some examples, ML model 140 generates the prompt templates, based on a question of "what data exists that will actually return results?" ML model 140 may avoid generating prompt templates that have null results. The prompt templates are stored in prompt library 124 in the user group data for each user group, in operation 304.

Entity values 130 are generated in operation 306, using the user group data for the user groups. In some examples, ML model 142 generates entity values 130 based on a question of "what data exists that will return results?", but at a finer degree of resolution than for the prompt templates.

Operation 308 prioritizes entity values 130 for inclusion in selections of entity values (e.g., selection of entity values 132) based on at least content of the user group data, such as other data content 128. In some examples, ML model 144 prioritizes entity values 130 based on a question of "what data exists that will return more valuable/meaningful results?" The selections of entity values are stored in entity library 126 in the user group data for each user group of the user groups, in operation 310. Operations 302-310 set up architecture 100 to be able to handle queries.

Operation 312 is a preliminary phase in which one user shares their privileges to search data content with another user who may not have the same privilege. This is a delegation of permissions, and is described in relation to FIG. 6.

A user, such as user 102, logs into terminal 110 and accesses generative AI model 160 in operation 314. Operation 316 determines the user group of each user that logs in, such as by using that user's user profile (e.g., by noting user group ID 154 in user profile 152 for user 102). Operation 318 determines the role of each user using the user profiles (e.g., by noting role 156 in user profile 152 for user 102). In some examples, each role in a user group corresponds to a position in organization hierarchy 109. Operation 320 determines permissions associated with the roles of the users, using the user profiles (e.g., by noting permissions 158 in user profile 152 for user 102). In some examples, permissions include permissions to see data regarding other users that are lower in organization hierarchy 109 and/or exclude permissions to see data regarding other users that are higher in organization hierarchy 109 or elsewhere, distantly removed, in organization hierarchy 109. Operations 314-320 set up architecture 100 to be able to customize prompt templates, including selections of entity values, for specific users.

Continuing with FIG. 3B, operations 322-348 are described relative to user 102, although equivalent operations are performed for the other users 104, 106, and 406, for the scenarios of FIGS. 4-6. Operation 322 presents UI 200 to user 102, including presenting query editor 212 to user 102 in UI 200. Operation 324 uses user group data 122 for user group 108 of user 102 to select prompt template 202, which has entity placeholder 230. Operation 326 populates query editor 212 with prompt template 202. In some examples, upon initially populating query editor 212 with prompt template 202, entity placeholder 230 holds default entity value 234. In some examples, default entity value 234 comprises a preselected entity value (e.g., "collaboration hours" as shown in FIG. 2C) or a generic entity placeholder name, as shown in FIG. 4. In some examples, upon initially populating query editor 212 with prompt template 202, entity placeholder 230 is marked with highlighting, such as a background color or a font difference.

Decision operation 328 determines whether user 102 accepts prompt template 202 as the final version for query 162 (e.g., by clicking on send button 216). If not, user 102 edits prompt template 202 in operation 330. Decision operation 332 determines whether user 102 is editing prompt template 202 within an entity placeholder (e.g., entity placeholder 230 or entity placeholder 232) or outside of all entity placeholders. The scenario of editing prompt template 202 outside of all entity placeholders is described below in relation to FIG. 7.

User 102 edits prompt template 202 inside entity placeholder 230 by selecting from menu 242 of selection of entity values 132 using pointing device 114 (see FIG. 2E), or by typing into entity placeholder 230 (see FIG. 2F). Based on at least user 102 editing entity placeholder 230, operation 338 selects selection of entity values 132 for filling entity placeholder 230, using user group data 122. The selection may further be based on at least permissions 158 associated with role 156 of user 102, and/or based on at least the prioritizing of entity values, as indicated by priority indication 134. In some examples, ML model 142 selects entity values for filling entity placeholder 230.

When using pointing device 114, operation 340 presents selection of entity values 132 to user 102 as menu 242. When typing, operation 342 updates selection of entity values 132 with each keystroke and then returning to operation 338. Operation 344 fills entity placeholder 230, in query editor 212, with entity value 244 selected by user 102. Some examples restrict editing such that entity placeholders may be filled only with the presented selections of entity values. Some examples permit a greater degree of flexibility, and entity placeholders may be filled with any text selected by the user. Flowchart 300 then returns to decision operation 328 to determine whether user 102 accepts prompt template 202.

When user 102 does accept prompt template 202 as the final version for query 162, operation 346 performs query 162 of generative AI model 160 using prompt template 202 with entity value 244. Operation 348 presents query results

204 of query 162 to user 102, such as in UI 200. ML model 144 learns to prioritize entity values 130 on an ongoing basis, which is shown as operation 350.

FIG. 4 illustrates use of the architecture 100 by user 406 in a different user group, specifically user group 408, than user group 108, which has user 102. Because user group 408 and user group 108 represent different organizations, user group data 422 is a different data set than user group data 122, and has different content. Thus, query templates, entity placeholders, and entity templates may differ.

Computing environment 120 hosts relevant data for user group 408 that corresponds to the data described for user group 108, including user group data 422 and a user profile library 450. User group data 422 has a prompt library 424 and an entity library 426. Prompt library 424 has at least a prompt template 402. Entity library 426 has entity values 436, priority indication 434 indicating the priority of various ones of entity values 436 for suggesting to users, and at least a selection of entity values 432 that is selected from among entity values 436 for presentation specifically to user 406 when user 406 is editing prompt template 402. Other data content 428 includes information about user group 408.

User profile library 450 holds at least user profile 452 for user 406. User profile 452 has a user group ID 454, indicating that user 406 is a member of user group 408, as well as role 456 of user 406 within user group 408, and permissions 458 associated with role 456 relative to information within other data content 428. Generative AI model 160 receives query 462, in the format of prompt template 402 and returns query results 404. Generation of the data within prompt library 424 and entity library 426, and selection of entity values may be similar to that described for user group 108.

Considering the operations of flowchart 300, relative to the scenario of FIG. 4, operation 324 selects prompt template 402 using user group data 422 for user group 408 of user 406. Prompt template 402 comprises entity placeholder 430. User group data 422 differs from user group data 122 based on at least user group 408 differing from user group 108. In the illustrated scenario, prompt template 402 matches prompt template 202. However, as used herein, prompt templates match when entity placeholders match (in the abstract), which excludes requiring that the entity values with the entity placeholders necessarily match.

Operation 326 populates a query editor 412 with prompt template 402. Operation 338 selects selection of entity values 432 for filling entity placeholder 430, using user group data 422. The selection may further be based on at least permissions 458 associated with role 456 of user 406, and/or based on at least the prioritizing of entity values, as indicated by priority indication 434. Comparing FIG. 4 to FIG. 2E, selection of entity values 432 differs from selection of entity values 132, based on at least user group 408 differing from user group 108. Selection of entity values 432 is shown in a menu 442 displayed nearby prompt template 402, and indicating that an entity value 244 that reads "email hours" is selected.

Operation 340 presents selection of entity values 432 to user 406, and operation 344 fills entity placeholder 430, in query editor 412, with entity value 444 selected by user 406. Operation 346 performs query 462 of generative AI model 160 using prompt template 402 with entity value 444, and operation 348 presents query results 404 of query 462 to user 406.

FIG. 5 illustrates use of the architecture 100 by user 104, rather than user 102. Considering the operations of flowchart 300, relative to the scenario of FIG. 5, operation 324 selects prompt template 502 using user group data 122 for user 104. Prompt template 502, which is shown as being stored in prompt library 124, comprises an entity placeholder 530. In this scenario also, prompt template 502 matches prompt template 202. Operation 326 populates a query editor 512 with prompt template 502.

Operation 338 selects a selection of entity values 532, which is shown as being stored in entity library 126, for filling entity placeholder 530, using user group data 122. The selection may further be based on at least permissions 558 associated with a role 556 of user 104 indicated in a user profile 552 for user 104, which has a user group ID 554 showing that user 104 is in user group 108. Comparing FIG. 5 to FIG. 2E, selection of entity values 532 differs from selection of entity values 132, based on at least role 556 of user 104 differing from role 156 of user 102 (e.g., because permissions 558 differ from permissions 158). Selection of entity values 532 is shown in a menu 542 displayed nearby prompt template 502, and indicating that an entity value 544 that reads "email hours" is selected.

In some examples, this selection of different entities (based on differing user permissions) uses sensitivity tags 528 within other content 128. Sensitivity tags 128 is meta-data for the data elements of other content 128 that identifies to whom the tagged data may be revealed. Sensitivity may range from none (i.e., publicly disclosable without limitation) to highly restrictive that limits viewership to only a select few user roles. Sensitivity tags 128 may be based on both personal privacy concerns (i.e., PII controls) and organizational data security needs, such as restricting information about certain aspects of user group 108 to people who have a legitimate need to know. For example, the number of employees within some section of user group 108 may be restricted to leadership of that section of user group 108. In such examples, organizational insights dataset 172 may import sensitivity tags 528, which are used by ML model 142 to restrict potential entity values 130. In some examples, a permission enforcement component 526 matches the user's permissions (e.g., permissions 558 or permissions 158) with sensitivity tags 528.

Operation 340 presents selection of entity values 532 to user 104, and operation 344 fills entity placeholder 530, in query editor 512, with entity value 544 selected by user 104. Operation 346 performs a query 562 of generative AI model 160 using prompt template 502 with entity value 544, and operation 348 presents query results 504 of query 562 to user 104.

FIG. 6 illustrates use of the architecture 100 with shared permissions. In the scenario depicted in FIG. 6, user 104 has a higher degree of permissions than user 102, due to the different positions in organization hierarchy 109. For example, profile library 150 has a user profile 652 for user 102 that has a user group ID 654, indicating that user 106 is a member of user group 108, as well as role 656 of user 106 within user group 108, and permissions 658 associated with role 656 relative to information within other data content 128. Without the assignment of permissions, permissions 658 associated with role 656 of user 106 within user group 108 differ from permissions 558 associated with role 556 of user 104. That is, without the assignment of permissions 558 to user 106, permission enforcement component 526 matches permissions 658 (for user 106) with sensitivity tags 528 and returns only entity values 130 that user 106 is permitted to see, based on permissions 658.

Considering the operations of flowchart 300, relative to the scenario of FIG. 6, operation 312 assigns permissions 558 associated with role 556 of user 104 to user 106 within user group 108. This assignment is stored within permission assignment data 626. Operation 324 selects prompt template 602 using user group data 122 for user 104 and permissions 558 associated with role 556 of user 104 (even the user is actually user 106). Now, with the assignment of permissions 558 to user 106, permission enforcement component 526 consults permission assignment data 626 and instead matches permissions 558 (for user 104) with sensitivity tags 528 and returns selection 632 of entity values 130 to user 106. Prompt template 602, which is shown as being stored in prompt library 124, comprises an entity placeholder 630. In this scenario also, prompt template 502 matches prompt template 202. Operation 326 populates a query editor 612 with prompt template 602.

Operation 338 selects a selection of entity values 632, which is shown as being stored in entity library 126, for filling entity placeholder 630, using user group data 122 and permissions 558. Comparing FIG. 6 to FIG. 5, selection of entity values 632 is the same as selection of entity values 532, even if the native permissions 658 for user 106 are lower than permissions 558 of user 104. Selection of entity values 632 is shown in a menu 642 displayed nearby prompt template 602, and indicating that an entity value 544 that reads "email hours" is selected.

Operation 340 presents selection of entity values 632 to user 106, and operation 344 fills entity placeholder 630, in query editor 612, with entity value 644 selected by user 106. Operation 346 performs a query 662 of generative AI model 160 using prompt template 602 with entity value 644, and operation 348 presents query results 604 of query 662 to user 106.

FIG. 7 illustrates user 102 editing prompt template 202 outside of all entity placeholders. Prompt library is shown as having a prompt template 702 and a prompt template 706. Considering the operations of flowchart 300, relative to the scenario of FIG. 7, operation 324 selects prompt template 702 using user group data 122 for user 102, as described previously. Prompt template 702 comprises an entity placeholder 730. Operation 326 populates query editor 212 with prompt template 702.

Decision operation 332 determines that user 102 is editing prompt template 202 outside of all entity placeholders. Note that, as shown in FIG. 7, pointer indicator 214 is over the word "What" in prompt template 202. Upon user 102 clicking pointing device 114, operation 334 selects prompt template 706, using user group data 122, based on at least user 102 editing prompt template 702 outside of entity placeholder 730. Prompt template 706 comprises an entity placeholder 732.

Flowchart 300 returns to operation 326 to populate query editor 212 with prompt template 706. Upon user 102 accepting prompt template 706, operation 346 performs query 762 of generative AI model 160 using prompt template 706, and operation 348 presents query results 704 of query 762 to user 102.

FIG. 8 shows a flowchart 800 illustrating exemplary operations that may be performed by architecture 100. In some examples, operations described for flowchart 800 are performed by computing device 900 of FIG. 9. Flowchart 800 commences with operation 802, which includes selecting, using first user group data for a first user group of a first user, a first prompt template which comprises a first entity placeholder. Operation 804 includes populating a first query editor with the first prompt template.

Operation 806 includes, based on at least the first user editing the first entity placeholder, selecting, using the first user group data, a first selection of entity values for filling the first entity placeholder. Operation 808 includes presenting the first selection of entity values to the first user. Operation 810 includes filling the first entity placeholder, in the first query editor, with a first entity value selected by the first user. Operation 812 includes performing a first query of a generative AI model using the first prompt template with the first entity value. Operation 814 includes presenting first query results of the first query to the first user.

Additional Examples

An example system comprises: a processor; and a computer-readable medium storing instructions that are operative upon execution by the processor to: select, using first user group data for a first user group of a first user, a first prompt template, the first prompt template comprising a first entity placeholder; populate a first query editor with the first prompt template; based on at least the first user editing the first entity placeholder, select, using the first user group data, a first selection of entity values for filling the first entity placeholder; present the first selection of entity values to the first user; fill the first entity placeholder, in the first query editor, with a first entity value selected by the first user; perform a first query of a generative AI model using the first prompt template with the first entity value; and present first query results of the first query to the first user.

An example computer-implemented method comprises: selecting, using first user group data for a first user group of a first user, a first prompt template, the first prompt template comprising a first entity placeholder; populating a first query editor with the first prompt template; based on at least the first user editing the first entity placeholder, selecting, using the first user group data, a first selection of entity values for filling the first entity placeholder; presenting the first selection of entity values to the first user; filling the first entity placeholder, in the first query editor, with a first entity value selected by the first user; performing a first query of a generative AI model using the first prompt template with the first entity value; and presenting first query results of the first query to the first user.

One or more example computer storage devices have computer-executable instructions stored thereon, which, on execution by a computer, cause the computer to perform operations comprising: selecting, using first user group data for a first user group of a first user, a first prompt template, the first prompt template comprising a first entity placeholder; populating a first query editor with the first prompt template; based on at least the first user editing the first entity placeholder, selecting, using the first user group data, a first selection of entity values for filling the first entity placeholder; presenting the first selection of entity values to the first user; filling the first entity placeholder, in the first query editor, with a first entity value selected by the first user; performing a first query of a generative AI model using the first prompt template with the first entity value; and presenting first query results of the first query to the first user.

Alternatively, or in addition to the other examples described herein, examples include any combination of the following:

selecting, using second user group data for a second user group of a second user, a second prompt template;

the second prompt template comprises a second entity placeholder;

the second user group data differs from the first user group data based on at least the second user group differing from the first user group, wherein the second prompt template matches the first prompt template;

populating a second query editor with the second prompt template;

based on at least the second user editing the second entity placeholder, selecting, using the second user group data, a second selection of entity values for filling the second entity placeholder;

the second selection of entity values differs from the first selection of entity values based on at least the second user group differing from the first user group;

presenting the second selection of entity values to the second user;

filling the second entity placeholder, in the second query editor, with a second entity value selected by the second user;

performing a second query of the generative AI model using the second prompt template with the second entity value;

presenting second query results of the second query to the second user;

selecting, using the first user group data for a third user, a third prompt template;

the third prompt template comprises a third entity placeholder;

the third user is in the first user group;

the third prompt template matches the first prompt template;

populating a third query editor with the third prompt template;

based on at least the third user editing the third entity placeholder, selecting, using the first user group data, a third selection of entity values for filling the third entity placeholder;

the third selection of entity values differs from the first selection of entity values based on at least permissions associated with a role of the third user within the first user group differing from permissions associated with a role of the first user within the first user group;

presenting the third selection of entity values to the third user;

filling the third entity placeholder, in the third query editor, with a third entity value selected by the third user;

performing a third query of the generative AI model using the third prompt template with the third entity value;

presenting third query results of the third query to the third user;

assigning the permissions associated with the role of the third user to a fourth user within the first user group;

without the assignment of permissions, permissions associated with a role of the fourth user within the first user group differ from the permissions associated with the role of the third user;

selecting, using the first user group data and the permissions associated with the role of the third user, a fourth prompt template comprising a fourth entity placeholder;

performing a fourth query of the generative AI model using the fourth prompt template;

presenting fourth query results of the fourth query to the fourth user;

selecting, using the first user group data for the first user, a fifth prompt template;

the fifth prompt template comprises a fifth entity placeholder;

populating the first query editor with the fifth prompt template;

based on at least the first user editing the fifth prompt
   template outside of the fifth entity placeholder, select-
   ing, using the first user group data, a sixth prompt
   template;
the sixth prompt template comprises a sixth entity place-
   holder;
populating the first query editor with the sixth prompt
   template;
performing a fifth query of the generative AI model using
   the sixth prompt template;
presenting fifth query results of the fifth query to the first
   user;
prioritizing entity values for inclusion in the first selection
   of entity values based on at least content of the user
   group data;
selecting the first selection of entity values comprises
   selecting the first selection of entity values based on at
   least the prioritizing of entity values;
editing the first entity placeholder comprises typing into
   the first entity placeholder;
editing the first entity placeholder comprises selecting
   from a menu of the first selection of entity values using
   a pointing device;
upon initially populating the first query editor with the
   first prompt template, the first entity placeholder holds
   a default entity value;
the default entity value comprises a generic entity place-
   holder name or a preselected entity value;
filling the first entity placeholder with the first entity value
   comprises replacing the default entity value;
generating the prompt templates using the user group data
   for the user groups;
generating the entity values using the user group data for
   the user groups;
the prompt templates are stored (in a prompt library) in
   the user group data for each user group;
prompt templates match when entity placeholders match,
   excluding entity values matching;
the selections of entity values are stored (in an entity
   library) in the user group data for each user group;
the selections of entity values are dynamically generated
   from the user group data for each user group;
an ML model prioritizes the entity values based on at least
   content of the user group data;
the ML model learns to prioritize the entity values on an
   ongoing basis;
determining, using user profiles, the user group of each
   user;
each user group corresponds to a different organization;
determining, using the user profiles, the role of each user;
each role in a user group corresponds to a position in an
   organization hierarchy;
each user group data (e.g., enterprise data) comprises
   attributes (e.g., job title, department, work location at
   various resolutions such as facility up to country)
   associated with different data elements from which the
   selections of entity are generated;
the permissions associated with the roles of the users
   include permissions to see data regarding other users
   that are lower in the organization hierarchy;
the permissions associated with the roles of the users
   exclude permissions to see data regarding other users
   that are higher in the organization hierarchy;
presenting the query editors to the user in a UI;
the selections of entity values are presented in the query
   editors;

presenting the query results in the UI;
the pointing device comprises a mouse or a trackpad or a
   touchscreen;
updating the selections of entity values with each key-
   stroke when typing characters within the entity place-
   holders;
an ML model selects the entity values for filling the entity
   placeholders;
upon initially populating the query editors with the
   prompt templates, the entity placeholders hold default
   entity values;
the default entity values comprise generic entity place-
   holder names or preselected entity values;
filling the entity placeholders with the entity values com-
   prises replacing the default entity values;
upon initially populating the query editors with the
   prompt templates, the entity placeholders are marked
   with highlighting or a font difference;
the entity placeholders may be filled only with the pre-
   sented selections of entity values;
the entity placeholders may be filled with any text
   selected by the users; and
the generative AI model comprises Copilot or Duet.
   While the aspects of the disclosure have been described in
terms of various examples with their associated operations,
a person skilled in the art would appreciate that a combi-
nation of operations from any number of different examples
is also within scope of the aspects of the disclosure.
Example Operating Environment
   FIG. 9 is a block diagram of an example computing
device 900 (e.g., a computer storage device) for implement-
ing aspects disclosed herein, and is designated generally as
computing device 900. In some examples, one or more
computing devices 900 are provided for an on-premises
computing solution. In some examples, one or more com-
puting devices 900 are provided as a cloud computing
solution. In some examples, a combination of on-premises
and cloud computing solutions are used. Computing device
900 is but one example of a suitable computing environment
and is not intended to suggest any limitation as to the scope
of use or functionality of the examples disclosed herein,
whether used singly or as part of a larger set.
   Neither should computing device 900 be interpreted as
having any dependency or requirement relating to any one or
combination of components/modules illustrated. The
examples disclosed herein may be described in the general
context of computer code or machine-useable instructions,
including computer-executable instructions such as program
components, being executed by a computer or other
machine, such as a personal data assistant or other handheld
device. Generally, program components including routines,
programs, objects, components, data structures, and the like,
refer to code that performs particular tasks, or implement
particular abstract data types. The disclosed examples may
be practiced in a variety of system configurations, including
personal computers, laptops, smart phones, mobile tablets,
hand-held devices, consumer electronics, specialty comput-
ing devices, etc. The disclosed examples may also be
practiced in distributed computing environments when tasks
are performed by remote-processing devices that are linked
through a communications network.
   Computing device 900 includes a bus 910 that directly or
indirectly couples the following devices: computer storage
memory 912, one or more processors 914, one or more
presentation components 916, input/output (I/O) ports 918,
I/O components 920, a power supply 922, and a network
component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more buses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein. Thus, computing device 900 comprises a computer storage device having computer-executable instructions 912b stored thereon.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer storage memory," "memory," and "memory devices" are synonymous terms for the memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represents an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., a cloud resource) across a computer network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:

select, using first user group data for a first user group of a first user, a first prompt template, the first prompt template comprising a first entity placeholder;
populate a first query editor with the first prompt template;
based on at least the first user editing the first entity placeholder, select, using the first user group data, a first selection of entity values for filling the first entity placeholder;
present the first selection of entity values to the first user;
fill the first entity placeholder, in the first query editor, with a first entity value selected by the first user;
perform a first query of a generative artificial intelligence (AI) model using the first prompt template with the first entity value; and
present first query results of the first query to the first user.

2. The system of claim 1, wherein the instructions are further operative to:
select, using second user group data for a second user group of a second user, a second prompt template, the second prompt template comprising a second entity placeholder, wherein the second user group data differs from the first user group data based on at least the second user group differing from the first user group, wherein the second prompt template matches the first prompt template;
populate a second query editor with the second prompt template;
based on at least the second user editing the second entity placeholder, select, using the second user group data, a second selection of entity values for filling the second entity placeholder, wherein the second selection of entity values differs from the first selection of entity values based on at least the second user group differing from the first user group;
present the second selection of entity values to the second user;
fill the second entity placeholder, in the second query editor, with a second entity value selected by the second user;
perform a second query of the generative AI model using the second prompt template with the second entity value; and
present second query results of the second query to the second user.

3. The system of claim 1, wherein the instructions are further operative to:
select, using the first user group data for a third user, a third prompt template, the third prompt template comprising a third entity placeholder, wherein the third user is in the first user group, wherein the third prompt template matches the first prompt template;
populate a third query editor with the third prompt template;
based on at least the third user editing the third entity placeholder, select, using the first user group data, a third selection of entity values for filling the third entity placeholder, wherein the third selection of entity values differs from the first selection of entity values based on at least permissions associated with a role of the third user within the first user group differing from permissions associated with a role of the first user within the first user group;
present the third selection of entity values to the third user;

fill the third entity placeholder, in the third query editor, with a third entity value selected by the third user;

perform a third query of the generative AI model using the third prompt template with the third entity value; and present third query results of the third query to the third user.

4. The system of claim 3, wherein the instructions are further operative to:

assign the permissions associated with the role of the third user to a fourth user within the first user group, wherein without the assignment of permissions, permissions associated with a role of the fourth user within the first user group differ from the permissions associated with the role of the third user;

select, using the first user group data and the permissions associated with the role of the third user, a fourth prompt template comprising a fourth entity placeholder;

perform a fourth query of the generative AI model using the fourth prompt template; and present fourth query results of the fourth query to the fourth user.

5. The system of claim 1, wherein the instructions are further operative to:

select, using the first user group data for the first user, a fifth prompt template, the fifth prompt template comprising a fifth entity placeholder;

populate the first query editor with the fifth prompt template;

based on at least the first user editing the fifth prompt template outside of the fifth entity placeholder, select, using the first user group data, a sixth prompt template, the sixth prompt template comprising a sixth entity placeholder;

populate the first query editor with the sixth prompt template;

perform a fifth query of the generative AI model using the sixth prompt template; and present fifth query results of the fifth query to the first user.

6. The system of claim 1, wherein the instructions are further operative to:

prioritize entity values for inclusion in the first selection of entity values based on at least content of the user group data, wherein selecting the first selection of entity values comprises selecting the first selection of entity values based on at least the prioritizing of entity values.

7. A computer-implemented method comprising:

selecting, using first user group data for a first user group of a first user, a first prompt template, the first prompt template comprising a first entity placeholder;

populating a first query editor with the first prompt template;

based on at least the first user editing the first entity placeholder, selecting, using the first user group data, a first selection of entity values for filling the first entity placeholder;

presenting the first selection of entity values to the first user;

filling the first entity placeholder, in the first query editor, with a first entity value selected by the first user;

performing a first query of a generative artificial intelligence (AI) model using the first prompt template with the first entity value; and presenting first query results of the first query to the first user.

8. The method of claim 7, further comprising:

selecting, using second user group data for a second user group of a second user, a second prompt template, the second prompt template comprising a second entity placeholder, wherein the second user group data differs from the first user group data based on at least the second user group differing from the first user group, wherein the second prompt template matches the first prompt template;

populating a second query editor with the second prompt template;

based on at least the second user editing the second entity placeholder, selecting, using the second user group data, a second selection of entity values for filling the second entity placeholder, wherein the second selection of entity values differs from the first selection of entity values based on at least the second user group differing from the first user group;

presenting the second selection of entity values to the second user;

filling the second entity placeholder, in the second query editor, with a second entity value selected by the second user;

performing a second query of the generative AI model using the second prompt template with the second entity value; and presenting second query results of the second query to the second user.

9. The method of claim 7, further comprising:

selecting, using the first user group data for a third user, a third prompt template, the third prompt template comprising a third entity placeholder, wherein the third user is in the first user group, wherein the third prompt template matches the first prompt template;

populating a third query editor with the third prompt template;

based on at least the third user editing the third entity placeholder, selecting, using the first user group data, a third selection of entity values for filling the third entity placeholder, wherein the third selection of entity values differs from the first selection of entity values based on at least permissions associated with a role of the third user within the first user group differing from permissions associated with a role of the first user within the first user group;

presenting the third selection of entity values to the third user;

filling the third entity placeholder, in the third query editor, with a third entity value selected by the third user;

performing a third query of the generative AI model using the third prompt template with the third entity value; and presenting third query results of the third query to the third user.

10. The method of claim 9, further comprising:

assigning the permissions associated with the role of the third user to a fourth user within the first user group, wherein without the assignment of permissions, permissions associated with a role of the fourth user within the first user group differ from the permissions associated with the role of the third user;

selecting, using the first user group data and the permissions associated with the role of the third user, a fourth prompt template comprising a fourth entity placeholder;

performing a fourth query of the generative AI model using the fourth prompt template; and presenting fourth query results of the fourth query to the fourth user.

11. The method of claim 7, further comprising:

selecting, using the first user group data for the first user, a fifth prompt template, the fifth prompt template comprising a fifth entity placeholder;

populating the first query editor with the fifth prompt template;

based on at least the first user editing the fifth prompt template outside of the fifth entity placeholder, selecting, using the first user group data, a sixth prompt template, the sixth prompt template comprising a sixth entity placeholder;

populating the first query editor with the sixth prompt template;

performing a fifth query of the generative AI model using the sixth prompt template; and presenting fifth query results of the fifth query to the first user.

12. The method of claim 7, further comprising:

prioritizing entity values for inclusion in the first selection of entity values based on at least content of the user group data, wherein selecting the first selection of entity values comprises selecting the first selection of entity values based on at least the prioritizing of entity values.

13. The method of claim 7, wherein editing the first entity placeholder comprises typing into the first entity placeholder; or wherein editing the first entity placeholder comprises selecting from a menu of the first selection of entity values using a pointing device.

14. The method of claim 7, wherein upon initially populating the first query editor with the first prompt template, the first entity placeholder holds a default entity value;

wherein the default entity value comprises a generic entity placeholder name or a preselected entity value; and wherein filling the first entity placeholder with the first entity value comprises replacing the default entity value.

15. A computer storage device having computer-executable instructions stored thereon, which, on execution by a computer, cause the computer to perform operations comprising:

selecting, using first user group data for a first user group of a first user, a first prompt template, the first prompt template comprising a first entity placeholder;

populating a first query editor with the first prompt template;

based on at least the first user editing the first entity placeholder, selecting, using the first user group data, a first selection of entity values for filling the first entity placeholder;

presenting the first selection of entity values to the first user;

filling the first entity placeholder, in the first query editor, with a first entity value selected by the first user;

performing a first query of a generative artificial intelligence (AI) model using the first prompt template with the first entity value; and presenting first query results of the first query to the first user.

16. The computer storage device of claim 15, wherein the operations further comprise:

selecting, using second user group data for a second user group of a second user, a second prompt template, the second prompt template comprising a second entity placeholder, wherein the second user group data differs from the first user group data based on at least the second user group differing from the first user group, wherein the second prompt template matches the first prompt template;

populating a second query editor with the second prompt template;

based on at least the second user editing the second entity placeholder, selecting, using the second user group data, a second selection of entity values for filling the second entity placeholder, wherein the second selection of entity values differs from the first selection of entity values based on at least the second user group differing from the first user group;

presenting the second selection of entity values to the second user;

filling the second entity placeholder, in the second query editor, with a second entity value selected by the second user;

performing a second query of the generative AI model using the second prompt template with the second entity value; and presenting second query results of the second query to the second user.

17. The computer storage device of claim 15, wherein the operations further comprise:

selecting, using the first user group data for a third user, a third prompt template, the third prompt template comprising a third entity placeholder, wherein the third user is in the first user group, wherein the third prompt template matches the first prompt template;

populating a third query editor with the third prompt template;

based on at least the third user editing the third entity placeholder, selecting, using the first user group data, a third selection of entity values for filling the third entity placeholder, wherein the third selection of entity values differs from the first selection of entity values based on at least permissions associated with a role of the third user within the first user group differing from permissions associated with a role of the first user within the first user group;

presenting the third selection of entity values to the third user;

filling the third entity placeholder, in the third query editor, with a third entity value selected by the third user;

performing a third query of the generative AI model using the third prompt template with the third entity value; and presenting third query results of the third query to the third user.

18. The computer storage device of claim 17, wherein the operations further comprise:

assigning the permissions associated with the role of the third user to a fourth user within the first user group, wherein without the assignment of permissions, permissions associated with a role of the fourth user within the first user group differ from the permissions associated with the role of the third user;

selecting, using the first user group data and the permissions associated with the role of the third user, a fourth prompt template comprising a fourth entity placeholder;

performing a fourth query of the generative AI model using the fourth prompt template; and presenting fourth query results of the fourth query to the fourth user.

19. The computer storage device of claim 15, wherein the operations further comprise:

selecting, using the first user group data for the first user, a fifth prompt template, the fifth prompt template comprising a fifth entity placeholder;

populating the first query editor with the fifth prompt template;

based on at least the first user editing the fifth prompt template outside of the fifth entity placeholder, selecting, using the first user group data, a sixth prompt template, the sixth prompt template comprising a sixth entity placeholder;

populating the first query editor with the sixth prompt template;

performing a fifth query of the generative AI model using the sixth prompt template; and presenting fifth query results of the fifth query to the first user.

20. The computer storage device of claim 15, wherein the operations further comprise:

prioritizing entity values for inclusion in the first selection of entity values based on at least content of the user group data, wherein selecting the first selection of entity values comprises selecting the first selection of entity values based on at least the prioritizing of entity values.

\* \* \* \* \*